United States Patent [19]

Ligorati et al.

[11] 4,196,097

[45] Apr. 1, 1980

[54] ZIEGLER CATALYSTS

[75] Inventors: Ferdinando Ligorati, Usmate; Renzo Invernizzi; Carlo Collu, both of Milan; Maurizio Fontanesi, Concorezzo, all of Italy

[73] Assignee: Euteco S.p.A., Milan, Italy

[21] Appl. No.: 839,958

[22] Filed: Oct. 6, 1977

[30] Foreign Application Priority Data

Oct. 19, 1976 [IT] Italy ................... 28521 A/76

[51] Int. Cl.$^2$ ................................. C08F 4/02
[52] U.S. Cl. ................... 252/429 C; 252/428; 252/430; 526/114; 526/115; 526/119; 526/121; 526/122
[58] Field of Search ............ 252/428, 429 C, 430

[56] References Cited

U.S. PATENT DOCUMENTS

| | | | |
|---|---|---|---|
| 3,170,906 | 2/1965 | Ueda et al. | 252/429 C X |
| 3,591,656 | 7/1971 | Kroll | 252/430 X |
| 3,711,423 | 1/1973 | Mertzweiller et al. | 252/430 X |
| 3,787,384 | 1/1974 | Stevens et al. | 252/429 C X |
| 4,076,923 | 2/1978 | Matsuura et al. | 252/429 C X |

FOREIGN PATENT DOCUMENTS

| | | |
|---|---|---|
| 1214653 | 11/1966 | Fed. Rep. of Germany . |
| 2035943 | 2/1971 | Fed. Rep. of Germany . |
| 1198422 | 12/1959 | France . |
| 942703 | 11/1961 | United Kingdom . |

OTHER PUBLICATIONS

C. A., vol. 70 (1969) 88426x.

*Primary Examiner*—Patrick Garvin
*Attorney, Agent, or Firm*—Sughrue, Rothwell, Mion, Zinn and Macpeak

[57] ABSTRACT

A Ziegler catalytic system comprising an organometallic compound of a metal of Groups I to III of the Periodic Table and a compound of a heavy metal of Groups IV to VI supported on a carrier, the latter being an activated amorphous alumina or alumino-silicate containing from 0.3 to 30% by weight of salts of metals of Groups IIb, IIIa, VIb and VIII with oxygenated inorganic anions, or of a mixture of the latter with salts of said metals of Groups IIb, IIIa, VIb and VIII with non-oxygenated inorganic anions, said salts being introduced into the carrier by contacting the latter with one or more solutions of said salts and the carrier being then activated by calcination at 250°–700° C.

22 Claims, No Drawings

ZIEGLER CATALYSTS

The present invention relates to Ziegler catalysts for use in the homo- and copolymerization of olefines by means of a process which uses low reaction pressures.

It has been known for some time that olefines can be polymerized by means of low pressure processes by resorting to the use of Ziegler catalysts.

The catalysts used are obtained by reacting one or more compounds of a transition element belonging to Groups IV to VI of the Periodic System, with an activator consisting of one or more organo-metallic compounds of elements belonging to Groups I to III of the Periodic System. The process is generally carried out in suspension, in solution or in the gaseous phase.

Subsequently processes have been discovered in which the components of the catalyst are used in combination with a support.

For example, according to the French Pat. No. 1,198,422 compounds of metals belonging to Groups IV to VI of the Periodic System are fixed on supports such as bentonite, pumice, silica gel and calcium phosphate, and are then activated by reduction with organo-aluminium compounds. According to this Patent the polymerization proceeds independently of the composition of the support. Therefore the only important factor is the composition of the catalyst fixed on the support. Moreover, a great disadvantage consists in the necessity of removing the residues of the catalyst and the support from the polymer produced, before the latter can be used.

Numerous subsequent patents relate to the use of supports which themselves play an active role in the catalysis; these must be of a specific and exactly defined nature and composition.

For example, the Belgian Pat. No. 609,261 uses phosphates of alkaline earth metals. However, these must be heated even up to 1000° C., before they can be made to react with titanium or vanadium compounds, in order to acquire sufficient catalytic activity for polymerization. In spite of this the polymer yields which are obtained are very low.

Another series of patents relates to the use of alumina supports. Generally, these are prepared from various types of hydrated mineral aluminas, which are then calcined to obtain the final anhydrous crystalline aluminas, characterised by well defined and critical properties. For example, the German Pat. No. 1,214,653 claims a process for preparing supported catalysts in which certain compounds of heavy metals from Groups IV to VIII of the Periodic System are made to react, for example, with a pyrogenic alumina support, the surface of which contains hydroxyl groups. The average size of the particles of the support must be less than about 0.1 microns and the concentration of the hydroxyl groups must be sufficiently high to enable them to react with at least $1 \times 10^{-4}$ equivalents of the transition metal per gram of support.

Moreover, the polymerization yields are so low, even when the pressures are raised to 190 atmospheres, that it is essential to purify the polymers obtained from the catalyst and the support.

The preparation of aluminas by any other methods is very laborious. For example, in the French Pat. No. 1,516,139, alumina to be used as a support is made by preparing sodium aluminate by reaction between aluminium and soda and treating a solution of this aluminate with gaseous carbon dioxide until hydrated crystalline alumina is obtained which is washed and dried at 120° C. The bayerite thus obtained is then calcined at 500° C. In this case too, apart from the difficulties of the various stages of the process for preparation of the support, the polymerization yields are also not very high.

Finally, in the German Patent Application Publication No. 2,035,943, a support is described consisting of a mixture of a metallic oxide with a halide of a trivalent metal, for instance, alumina and aluminium trichloride. However, this support is a blend obtained by mechanical mixing, for example in a ball mill, and the productivity and specific activity of the catalysts based on such supports are rather low.

We have now surprisingly found that improved results can be obtained by using a support consisting of alumina or an alumino-silicate of particular, excellent qualities, which contains in an intimate mixture one or more inorganic salts which increase and synergize its activity as a catalytic constituent to a very high degree.

Thus, the invention provides a Ziegler catalytic system formed by the combination of an organo-metallic compound of a metal of Group I, II or III of the Periodic System of the elements according to Mendeleef and a compound of a heavy metal of Group IV, V or VI of said Periodic System supported on a carrier, said carrier being an activated amorphous alumina or alumino-silicate containing from 0.3 to 30% by weight of one or more salts of metals from Groups IIb, IIIa, VIb and VIII of said Periodic System with oxygenated inorganic anions, or of a mixture of the latter with one or more salts of said metals from Groups IIb, IIIa, VIb and VIII with non-oxygenated inorganic anions, said salts being introduced into the amorphous alumina or alumino-silicate by contacting the latter with one or more solutions of said salts and said alumina or alumino-silicate being then activated by calcination at a temperature of from 250° to 700° C.

According to another aspect of the invention there is provided a process for the homo- or co-polymerization of olefins having from 2 to 10 carbon atoms per molecule, in which said homo- or co-polymerization is carried out by the low pressure Ziegler method in the presence of the above catalytic system.

The preferred inorganic salts are those of cadmium, zinc, aluminium, chromium, iron and cobalt. The preferred oxygenated inorganic anions are the sulphate, sulphite, phosphate, chlorate, perchlorate and halogen sulphonate anions.

The preferred non-oxygenated inorganic anions are the halogen anions.

The supports used in the catalyst of the invention may be prepared in a simple manner, even from commercial aluminas or alumino-silicates provided these are substantially amorphous. A typical example of amorphous alumina is the pseudo-boehmite.

A further important characteristic of the supports is their internal porosity. It is preferable that the latter be of relatively high value, that is to say, such as will ensure an easy absorption of the saline solutions used for the impregnation of the support. The best results have been obtained with supports having a pore volume of from 0.4 to 2 ml/g, and preferably from 1.2 to a 2 ml/g.

The grain size of the particles to be used as a support is not a critical factor. However, it is preferable to use particles having an average size of from 20 to 400 microns, and preferably from 40 to 200 microns. Granules of smaller size can in fact subsequently disintegrate excessively, especially during the reaction with the polymerization catalyst.

The aforementioned alumina or alumino-silicate is subjected to an impregnation treatment using one or more solutions of the preselected salts. Usually aqueous solutions are used. A wide range of salt concentrations can be used, according to the internal porosity of the support and the quantity of inorganic salt or salts which it is desired to introduce into the support.

The impregnation temperatures may vary within a wide range. However, it is generally preferable to carry out the impregnation at room temperature, even though temperatures of up to 150° C., usable, for instance, in the case of non-aqueous solutions, do not result in significant variations in the activity of the support.

In the case in which it is desired to introduce a mixture of inorganic salts into the support these can be added to the alumina or the alumina-silicate, by means of a single impregnation or by means of a series of impregnations with intervals for drying or possibly calcination of the support. For example, as will be described further on, it is possible to introduce a sulphate by impregnating the support with a solution of this salt and then, after drying the support, a second salt can be introduced by means of further impregnation with a solution of the second salt. This last process is also necessary in the case of the addition of a single salt, when the pore volume of the support is not sufficient for the absorption of the desired quantity of saline solution.

In each case, after the final impregnation treatment, the support must be subjected to a thermal activation treatment. This treatment serves to eliminate the water absorbed by the support and to limit the number of hydroxyl groups present in it, which, in too high a quantity, could hydrolize the polymerization catalyst.

The conditions in which this calcination operation is effected are not a critical factor, neither as regards the duration nor the pressure nor the gaseous atmosphere in which calcination is carried out. The calcination temperature may vary within a relatively wide range, normally from 250° C. to 700° C. As a heating temperature gradient for reaching the calcination temperature, that of 50° C./h can, for example, be chosen.

The support has, after calcination, a content of inorganic salts of from 0.3 and 30% by weight, and preferably from 1.5 to 15% by weight.

Furthermore, the aforesaid support has, as already stressed, the particular, important characteristic of being amorphous.

Amorphous supports prove to be much more efficient and active than similar supports having a high degree of crystallinity.

Other characteristics are, however, substantially similar to those of aluminas or alumino-silicates already described in the literature.

The pore volume, as already mentioned, is generally from 0.4 to 2 ml/g, and preferably from 1.2 to 2 ml/g. The surface area is generally from 100 to 400 m²/g, and preferably from 200 to 300 m²/g. The bulk density (non-compacted product) is generally from 0.2 to 0.8 g/ml, and preferably from 0.2 to 0.4 g/ml.

In the preparation of the catalytic system of the invention the alumina or alumino-silicate support is first reacted with a compound of a heavy metal from Group IV to VI of the Periodic System. This compound is preferably a compound of titanium, vanadium or chromium. Generally, the best results are obtained with compounds of titanium.

The aforementioned compounds can be of various types, such as halides, oxyhalides and alkoxyhalides. The best results are obtained with titanium tetrachloride.

The operation conditions under which the reaction is effected between the support and the aforesaid compounds are not critical. The aforesaid compound may be used, for example, in the gaseous or the vapour state, either pure or diluted with an intert gas; or it may be used in the liquid state or in solution. As solvents, the hydrocarbon solvents which are also conventionally used for the low pressure polymerization of the olefines can generally be used.

Preferably, the support is suspended in the aforesaid pure compound in the liquid state, or the support is washed with the aforesaid compound, likewise in the pure, liquid state.

The temperature and pressure of the reaction are not critical factors. For example, the pressure may be atmospheric and the temperature from 50° to 130° C., and preferably from 100° and 130° C.

The contact time between the alumina or alumino-silicate support and the aforesaid compound is generally from 0.5 to 5 hours, and preferably from 1 to 2 hours.

The reaction product (catalytic component) is conveniently washed, first with the compound used in the reaction, and subsequently with an inert hydrocarbon solvent, in order to remove the excess of heavy metal compound which has not been fixed to the support.

The ultimate analysis of the catalytic component after washing, shows that the content of heavy metal is generally from 0.4 to 3% by weight with respect to the support.

The catalyst according to the present invention, also includes, as already described hereabove, an organo-metallic compound of a metal from Group I to III of the Periodic System; for example, a compound of lithium, magnesium, aluminium or zinc. The best results have been obtained with alkyl-aluminium compounds and alkyl-aluminium halides, such as trimethylaluminium, triethylaluminium, tri-isobutylaluminium, diethylaluminium monochloride or monoethylaluminium dichloride. The best results are obtained with triethylaluminium and with tri-isobutylaluminium.

The catalyst of the present invention is applicable to the homo- or co-polymerization of olefines containing from 2 to 10 atoms of carbon per molecule; for example: ethylene, propylene, 1-butene, 1-pentene, 1-hexene and 4-methyl-1-pentene. It is particularly advantageous when used for the preparation of ethylene homo- or co-polymers. The homo- or co-polymerization of olefines can be effected in accordance with any of the conventional techniques, either in the gaseous phase or in solution. In the latter case, use is made of inert solvents, preferably aliphatic or cyclo-aliphatic hydrocarbons such as butane, pentane, hexane, heptane, cyclohexane, either singly or in mixture.

The pressures used in the polymerization are generally from atmospheric pressure up to 50 Kg/cm². The temperatures usually adopted are from 40° to 170° C., preferably from 80° to 130° C.

The organo-metallic compounds and the aforesaid catalytic component can be introduced into the polymerization reactor separately or they can be previously reacted by first placing them in contact with one another, generally for a period of from 15 to 120 minutes.

The quantity of organo-metallic compound which is used is not critical; however, preferably, this compound should be present in molar excess with respect to the heavy metal from Group IV to VI of the Periodic System present in the support. By way of indication, for example, in the case of a catalyst prepared from triethylaluminium and titanium tetrachloride, from 10 to 30 moles of alkylaluminium may be used for each gram atom of Ti.

The quantity of the catalytic component, produced by reaction of the support with the compound of a heavy metal of Group IV to VI of the Periodic System, may vary within a wide range depending on the parameters selected for the polymerization and also, on the characteristics (for example, molecular weight) which are required in the polymer. Moreover, this quantity is also determined by taking into account the quantity of heavy metal contained in the support. As an indication, for example, for polymerization in solution, the catalytic component may be used in an amount of from 50 to 400 mg/liters of reaction solvent.

In the polymerisation process the molecular weight of the homo- or co-polymers produced can, moreover, be controlled by adding to the polymerization medium one or more chain terminating agents. The use of hydrogen is preferred but it is also possible to use other agents such as diethylzinc and diethylcadmium.

The catalyst of the present invention shows a very high productivity and specific activity in the homo- and co-polymerization of olefines.

For example, in the case of the homo-polymerization of ethylene productivity values of 1500 g of polyethylene/g catalyst/h are exceeded. Using titanium catalysts, specific activities exceeding 100 Kg (and in some cases, even 180 Kg), of polyethylene/g titanium/h have been obtained.

Consequently, the concentration of harmful catalytic residues in the polymers produced is negligible. Therefore all the long and costly operations of purification of the polymers produced can be avoided and these can be used as they are.

A few examples are given hereafter, purely by way of illustration. These may not in any way be considered as a limitation of the invention.

EXAMPLE 1

20 g of an amorphous, commercial alumino-silicate in granular form, containing 13% by weight of $Al_2O_3$ and having a pore volume of 0.5 ml/g are dried for 6 hours at a temperature of 120° C. in the form of a fluid bed by flowing a current of nitrogen, to eliminate the absorbed water and completely free the pores.

10 ml of an aqueous 3% weight/volume solution of $CoSO_4$ are then added to the alumino-silicate at ambient temperature, under thorough agitation over a period of 15 minutes.

The impregnated alumino-silicate is dried for 6 hours at 120° C., and then subjected to a calcination treatment by heating it, with a heating temperature gradient of 50° C./h, up to 500° C., and maintaining it at this temperature for 12 hours. The operation is carried out in a fluid bed in a current of anhydrous nitrogen.

The support thus obtained contains 1.4% by weight of $CoSO_4$.

20 g of this alumino-silicate support are treated for one hour with 200 ml of pure, liquid $TiCl_4$, at a temperature of 120° C., under thorough agitation. The solid reaction product is separated and then washed, still at 120° C., with a further 200 ml of fresh $TiCl_4$, to remove the titanium oxychlorides produced. It is then washed several times, at 50° C., with anhydrous n-heptane until every trace of $TiCl_4$ has completely disappeared from the washing solvent, and finally dried.

The catalytic component thus prepared has a titanium content equal to 1.5% by weight with respect to the support. The polymerization is then effected in the following manner: 250 mg of the aforesaid catalytic component are suspended in 2 liters of anhydrous n-heptane ($H_2O$ 5 ppm) and 500 mg of triethylaluminium are then added. A catalytic complex is formed which is allowed to mature for about 1 hour; the whole suspension is then transferred to a 4-liter autoclave, fitted with an agitator.

The autoclave is then heated up to a temperature of 80° C., which is kept constant during the whole period of polymerization.

At this temperature ethylene and hydrogen are introduced in amounts corresponding to 4 atmospheres of ethylene and 4 atmospheres of hydrogen; the total pressure reached is kept constant for the whole period of the polymerization, by means of a continuous feed of fresh ethylene.

After one hour the autoclave is voided of gas, cooled and the polymer produced is filtered.

After washing and drying of the product, 400 g of polyethylene are obtained, which corresponds to a productivity of 1600 g of polyethylene/g catalyst/h.

The specific activity of the catalytic component, with respect to the quantity of titanium used, is 106.6 Kg of polyethylene/g titanium/h.

EXAMPLE 2

20 g of amorphous commercial alumina, with a pore volume of 2 ml/g, are impregnated at room temperature, under thorough agitation for a period of 15 minutes, with 20 ml of an aqueous 6.5% weight/volume solution of $Al_2(SO_4)_3.18\ H_2O$. The impregnated alumina is then dried for 6 hours at 120° C. and subsequently calcined by heating it, with a heating temperature gradient of 50° C./h, up to 700° C. and keeping it at this temperature for 12 hours. The support thus obtained contains 3.2% by weight of aluminium sulphate.

The preparation of the catalytic component by means of the impregnation of the support with $TiCl_4$ is effected as in Example 1. The catalytic component thus prepared has a titanium content equal to 0.92% by weight with respect to the support.

The polymerization of the ethylene is then effected as in Example 1. The productivity is 1650 g of polyethylene/g catalyst/h; the specific activity of the catalytic component is 179.3 Kg of polyethylene/g titanium/h.

EXAMPLE 3

An amorphous alumina having a pore volume of 2 ml/g is treated successively with two aqueous solutions, of $Al_2(SO_4)_3$ and of $AlCl_3.6H_2O$ respectively, in such a manner as to introduce into the alumina 2% by weight of aluminium sulphate and 4% by weight of aluminium chloride; the impregnations were separated by an intermediate drying operation.

The final drying of the alumina and its calcination are effected according to the procedure of Example 2.

The preparation of the catalytic component, by means of the impregnation of the support with $TiCl_4$, is effected as in Example 1. The catalytic component thus prepared has a titanium content equal to 0.7% by weight with respect to the support.

The polymerization of the ethylene is then effected as in Example 1. 320 g of polymer are obtained; the productivity is 1280 g of polyethylene/g catalyst/h; the specific activity of the catalytic component is 182.8 Kg of polyethylene/g titanium/h.

EXAMPLE 4

20 g of amorphous alumina having a pore volume of 2 ml/g are treated in the same manner as that described in Example 1, with an aqueous 15% weight/volume solution of $Al_2(SO_4)_3.18\ H_2O$.

After drying at 120° C. for 6 hours, the alumina contains 3.7% by weight of $Al_2(SO_4)_3$.

A second impregnation is then carried out, operating at room temperature, with thorough agitation and for a period of 15 minutes, with 30 ml of an aqueous 0.5% weight/volume solution of $Cr_2(SO_4)_3.18\ H_2O$. After drying the alumina at 120° C. for 6 hours, a third impregnation is carried out, still using chromium sulphate, with operational conditions identical to those of the second impregnation.

After further drying of the alumina at 120° C. for 6 hours, the latter is calcined by heating up to 500° C., with a heating temperature gradient of 20° C./h, and keeping it at this temperature for 12 hours.

The support thus obtained contains 0.82% by weight of $Cr_2(SO_4)_3$ and 3.7% by weight of $Al_2(SO_4)_3$.

The preparation of the catalytic component, by means of the impregnation with $TiCl_4$, is effected as in Example 1. The catalytic component thus prepared has a titanium content equal to 1.5% by weight with respect to the support.

The polymerization of the ethylene is then effected as in Example 1. The productivity is 2175 g of polyethylene/g catalyst/h; the specific activity of the catalytic component is 145 Kg of polyethylene/g titanium/h.

EXAMPLE 5

10 g of amorphous alumino-silicate, containing 25% of $Al_2O_3$ and having a pore volume of 1.2 ml/g, are treated, in an identical manner to that described in Example 1, with 10 ml of an aqueous 5% weight/volume solution of $Co(ClO_4)_2.6\ H_2O$;

The alumino-silicate is then dried for 6 hours at 130° C. and then calcined for 6 hours at 250° C. The support thus obtained contains 3.6% by weight of $Co(ClO_4)_2$.

5 g of the aforesaid support are treated with 100 ml of pure, liquid $VOCl_3$, at a temperature of 80° C. for 1 hour, under thorough agitation. The solid reaction product is filtered, washed first with 50 ml of pure $VOCl_3$, still at 80° C., and then several times with a series of portions each of 50 ml of anhydrous n-heptane, until the $VOCl_3$ has completely disappeared from the washing hydrocarbon, and then dried.

The catalytic component thus prepared has a vanadium content equal to 1% by weight with respect to the support.

70 mg of the aforesaid catalytic component are suspended in 1000 ml of anhydrous n-heptane and 100 mg of tri-isobutylaluminium are added. After a period of maturing of 15 minutes, the whole suspension is transferred to a 2-liter autoclave, equipped with an agitator.

The polymerization of the ethylene is then effected under the same conditions as described in Example 1, except that a pressure of 2 atmospheres of ethylene and 2 atmospheres of hydrogen is used.

138 g of polymer are obtained. The productivity is 1971 g of polyethylene/g catalyst/h; the specific activity of the catalytic component is 197.1 Kg of polyethylene/g vanadium/h.

What we claim is:

1. In a Ziegler catalytic system comprising the combination of an organo-metallic compound of a metal of Group I, II or III of the Periodic System of the Elements according to Mendeleef and a compound of a heavy metal of Group IV, V or VI of said Periodic System supported on a carrier, the improvement comprising said carrier being an activated amorphous alumina or alumino-silicate containing from 0.3 to 30% by weight of one or more salts of metals from Group IIb, IIIa, VIb and VIII or said Periodic System with one or more oxygenated inorganic anions selected from the group consisting of sulphate, sulphite, phosphate, chlorate, perchlorate and halogen-sulphonate anions, or a mixture of the latter with one or more salts of said metals from Groups IIb, IIIa, VIb and VIII with one or more non-oxygenated halogen anions, said salts being introduced into the amorphous alumina or alumino-silicate by contacting the latter with one or more solutions of said salts and said alumina or alumino-silicate being then activated by calcination at a temperature of from 250° C. to 700° C.

2. The catalytic system of claim 1, wherein said salts are selected from the group consisting of the salts of cadmium, zinc, aluminum, chromium, iron and cobalt.

3. The catalytic system of claim 1, wherein said activated amorphous alumina or alumino-silicate contains from 1.5 to 15% by weight of said salts.

4. The catalytic system of claim 1, wherein said heavy metal is selected from the group consisting of titanium, vanadium and chromium.

5. The catalytic system of claim 1, wherein said compound of a heavy metal is selected from the group consisting of halides, oxyhalides and alkoxyhalides.

6. The catalytic system of claim 1, wherein said compound of a heavy metal is titanium tetrachloride.

7. The catalytic system of claim 1, wherein said organo-metallic compound is selected from the group consisting of alkylaluminum compounds and alkylaluminum halides.

8. The catalytic system of claim 1, wherein said organo-metallic compound is selected from the groups consisting of triethylaluminum and triisobutylaluminum.

9. The catalytic system of claim 1, wherein said one or more salts are impregnated into said support by contacting the same with an aqueous solution of said one or more salts.

10. The catalytic system of claim 9, wherein said activation eliminates water absorbed by the support during said impregnation and limits the number of hydroxyl groups present therein to ensure that the same do not hydrolyze said catalyst.

11. The catalytic system of claim 1 consisting essentially of said organo-metallic compound and said support containing said one or more salts.

12. In a process for preparing a Ziegler catalytic system comprising the combination of an organo-metallic compound of a metal of Group I, II or III of the Periodic System of the Elements according to Mendeleef and a supported compound of a heavy metal of Group IV, V or VI of said Periodic System on a carrier, the improvement wherein said carrier is an activated amorphous alumina or alumino-silicate carrier containing from 0.3 to 30% by weight of one or more salts of metals from Groups IIb, IIIa, VIb and VIII of said Periodic System with one or more oxygenated inorganic anions selected from the group consisting of sulphate, sulphite, phosphate, chlorate, perchlorate and halogen-sulphonate anions, or of a mixture of the latter with one or more salts of said metals from Groups IIb, IIIa, VIb and VIII with one or more non-oxygenated halogen anions by contacting the amorphous alumina or alumino-silicate with one or more solutions of said salts and activating the thus treated alumina or alumino-silicate by calcination at a temperature of from 250° to 700° C., contacting said activated alumina or alumino-silicate with said compound of a heavy metal to fix the latter on the carrier, and combining the resulting supported compound with said organic-metallic compound.

13. A process according to claim 12, characterized in that said salts are chosen from the salts of cadmium, zinc, aluminium, chromium, iron and cobalt.

14. A process according to claim 12, characterized in that said activated amorphous alumina or alumino-silicate contains from 1.5 to 15% by weight of said salts.

15. A process according to claim 12, characterized in that said heavy metal is chosen from titanium, vanadium and chromium.

16. A process according to claim 12, characterized in that said compound of a heavy metal is chosen from halides, oxyhalides and alkoxyhalides.

17. A process according to claim 12, characterized in that said compound of a heavy metal is titanium tetrachloride.

18. A process according to claim 12, characterized in that said organo-metallic compound is an alkylaluminium compound or an alkylaluminium halide.

19. A process according to claim 12, characterized in that said organo-metallic compound is triethylaluminium or triisobutylaluminium.

20. The process according to claim 12, wherein said one or more salts are impregnated into said support by contacting the same with an aqueous solution of said one or more salts.

21. The process according to claim 20, wherein said activation eliminates water absorbed by the support during said impregnation and limits the number of hydroxyl groups present therein to ensure that the same do not hydrolyze said catalyst.

22. The process according to claim 11, wherein said catalytic system consists essentially of said organo-metallic compound and said support containing said one or more salts.